Dec. 24, 1957 H. W. PATTON 2,817,818

CAPACITY VANE MODULATOR

Filed March 18, 1954 3 Sheets-Sheet 1

INVENTOR.
HENRY W. PATTON
BY Marvin Moody
ATTORNEY

CAPACITY VANE MODULATOR

Filed March 18, 1954 3 Sheets-Sheet 2

INVENTOR.
HENRY W. PATTON
BY Marvin Moody
ATTORNEY

CAPACITY VANE MODULATOR

Filed March 18, 1954 3 Sheets-Sheet 3

INVENTOR.
HENRY W PATTON
BY Marvin Moody
ATTORNEY 2,817,818

CAPACITY VANE MODULATOR

Henry W. Patton, Cedar Rapids, Iowa, assignor to Collins Radio Company, Cedar Rapids, Iowa, a corporation of Iowa Application March 18, 1954, Serial No. 416,984

3 Claims. (Cl. 332—2)

This invention relates generally to modulators and particularly to a modulator that converts a varying direct current into a proportional alternating current.

Briefly, the invention takes a constant amplitude alternating voltage input, generally designated as a commutating voltage in regard to modulators, and amplitude modulates it by means of a direct voltage signal. The modulated commutating voltage is the output signal.

One use of such modulators is in amplifiers of direct current signals. Such amplifiers convert a small direct current signal into an alternating current, amplify it, and reconvert it to direct current. Direct current amplification is obtained with the stability of alternating current amplification.

There has been difficulty in finding suitable modulators for very small direct current signals. The minimum signal that may be converted is determined in part by the noise generated within the modulator.

It is accordingly an object of this invention to provide a modulator which has a good signal to noise ratio.

It is another object of this invention to provide a modulator which isolates the direct current signal circuit from the alternating current circuit to prevent the commutating voltage from interfering with the signal.

It is still another object of this invention to provide a modulator that obtains high amplification during the modulation process.

It is a further object of this invention to provide a modulator in which output linearity is easily controllable.

A feature of this invention is a vane that is rotatably mounted between a pair of fixed capacitor plates. A galvanometer drives the vane in response to a direct current signal and proportionally varies the capacitance between the vane and the fixed capacitor plates. An alternating voltage is applied across the varying capacitance and is hence modulated.

Further objects, features and advantages will be apparent to a person skilled in the art upon further study of the specification and drawings, in which.

Figure 6:
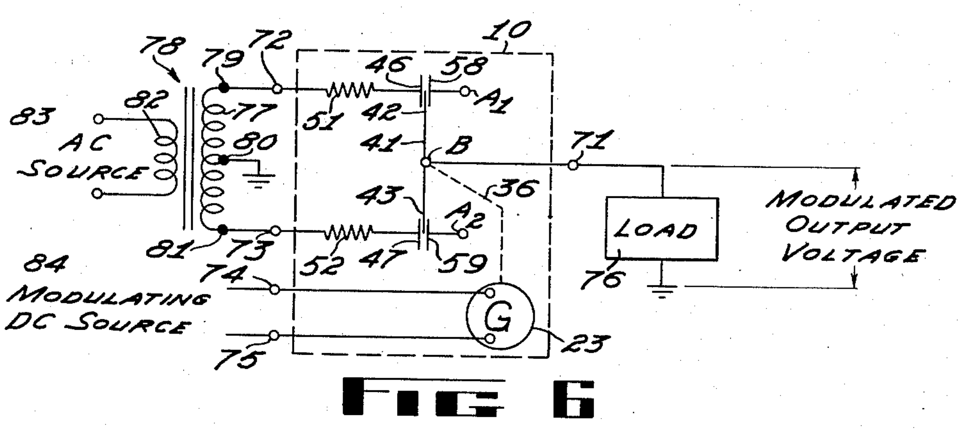
Figure 6 is a wiring diagram of one embodiment of the invention.
Figure 7:
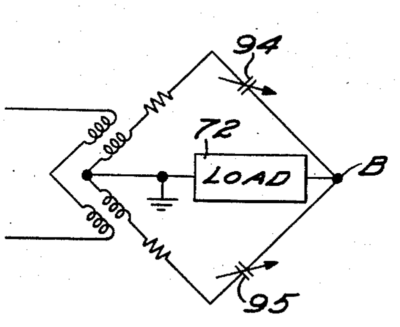
Figure 8:
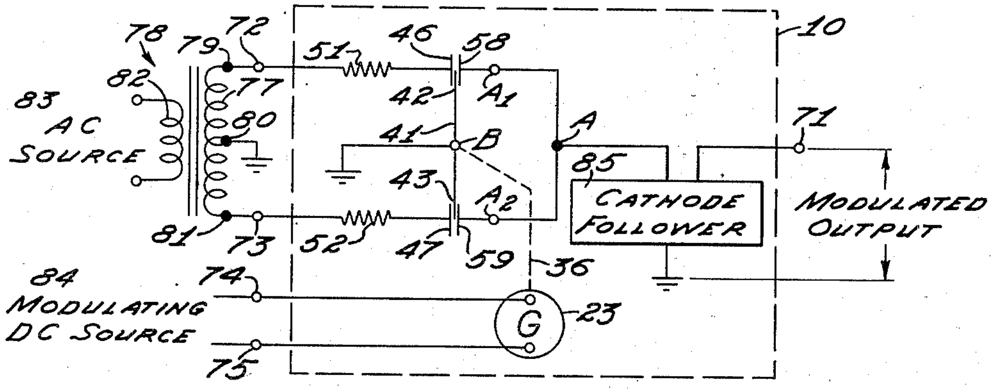
Figure 10:
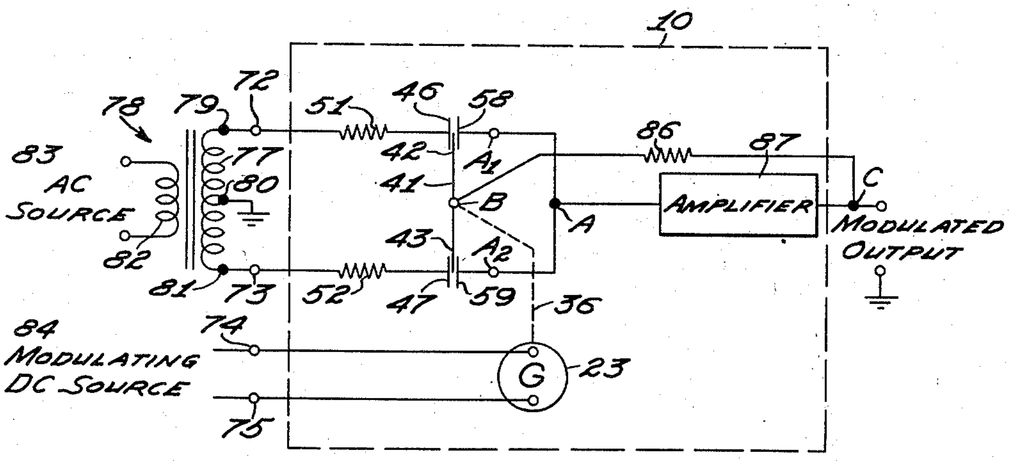
Figure 9:
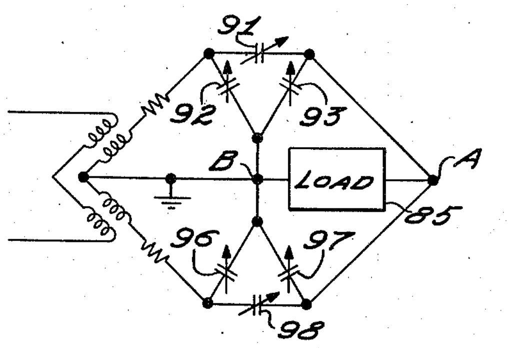

Figure 7 provides a circuit that is electrically equivalent to the wiring circuit in Figure 6;

Figure 8 shows a wiring diagram for another embodiment of the invention;

Figure 9 provides a circuit that is electrically equivalent to the wiring circuit in Figure 8; and, Figure 10 shows a wiring diagram for still another embodiment of the invention.

Figure 1:
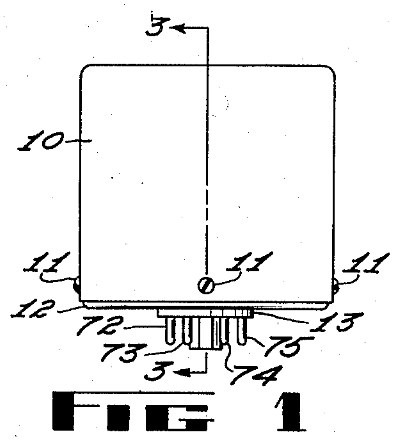
Figure 1 is an elevational view of this invention.
Figure 2:
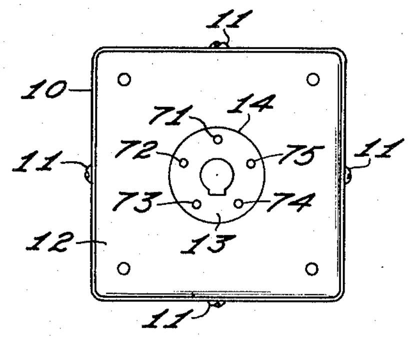
Figure 2 is a bottom view.

Now referring to the drawings, Figure 1 shows a shield 10 fastened by screws 11 to a base member 12 which supports the invention. A tube base 13 is fixed to base member 12 within a centrally located hole 14.

A supporting plate 16 (shown in Figures 3 and 4) is mounted above member 12 by a plurality of standoffs 17. A cylindrical casing 18, open at both ends, is fastened in an upright position to supporting plate 16 by rivets 19, and permanent magnets 21 and 22 of a galvanometer 23 are fixed within cylindrical casing 18.

A first annular plate 26 of insulating material is mounted on the upper end of cylindrical casing 18; and a second annular plate 27, also of insulating material, is supported parallel to first plate 26 by a plurality of spacers 28.

A bearing support bracket 29 is mounted on second plate 27 and supports in its midsection 31 a first bearing 32. A second bearing holder 33 is centrally fastened to support plate 16 and contains a second bearing 34. A shaft 36 is rotatably supported by bearings 32 and 34 and extends centrally through the openings in both annular rings.

The armature 37 of galvanometer 23 is mounted on shaft 36 between magnets 21 and 22. A first spiral spring 38 is fixed between casing 18 and armature 37 and connects electrically to one side of the armature coil. A second spring 39 is likewise fixed between casing 18 and armature 37 and connects electrically to the other side of the armature coil.

A thin vane 41 of conducting material is transversely fixed to shaft 36 and has a pair of fan shaped arms 42 and 43 that extend symmetrically between annular rings 26 and 27.

Figure 5:
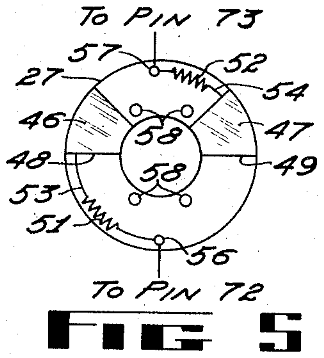
Figure 5 shows an annular plate.

A pair of capacitor plates 46 and 47 are fixed to annular ring 27, as shown in Figure 5, and may be printed on ring 27 by a suitable conducting paint. The edges 48 and 49 of plates 46 and 47 are aligned diametrically and plates 46 and 47 are positioned on the same half of annular ring 27. A pair of equal resistors 51 and 52 are also printed on ring 27 with a suitable resistance paint and connect at one end with plates 46 and 47, respectively, by means of printed leads 53 and 54. A pair of terminals 56 and 57 are riveted to ring 27 and connect to the other ends of resistors 51 and 52, respectively, and provide means for connecting the resistors to external wires.

The other annular ring 26 (best shown in Figure 4) likewise has capacitor plates 58 and 59 printed thereon in the same manner and with the same dimensions as annular ring 27. A pair of printed leads 61 and 62 connect plates 58 and 59 to a pair of riveted terminals $A_1$ and $A_2$, respectively.

Capacitor plates 46 and 58 are spaced facing each other as are plates 47 and 59 while the vane arms are spaced equally between annular rings 26 and 27.

A third spiral spring 63 provides an electrical connection to vane 41 from point B on bracket 29.

Figure 4:
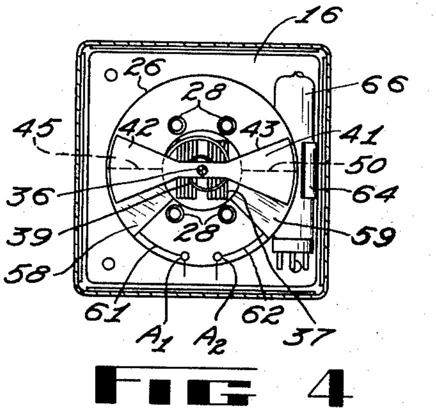
Figure 4 shows a sectional view taken at section 4—4 in Figure 3.

A tube clip 64 is fixed to support plate 16 and may be used to hold an electron tube 66 shown in Figure 4.

Figure 3:
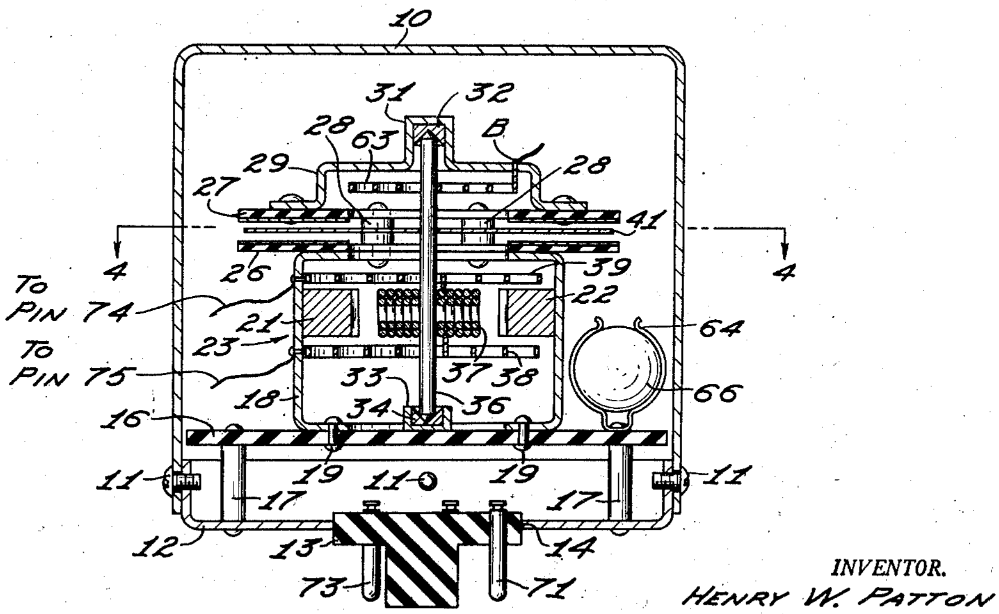
Figure 3 illustrates a sectional view taken across section 3—3 in Figure 1.

The electrical components in Figures 3, 4 and 5 may be wired as shown in either Figure 6, 8 or 10. Figure 6 shows perhaps the simplest way of wiring the invention where plates 58 and 59 are left unconnected. Point B, which connects to moving vane 41, is connected by base pin 71 to a grounded load 76, which will usually be the input circuit of a cathode follower.

The secondary 77 of a transformer 78 has its ends 79 and 81 connected to resistors 51 and 52 by pins 72 and 73, respectively, and the center tap 80 of secondary 77 is grounded. The primary 82 of transformer 78 is connected to an alternating source 83 of commutating voltage.

The shaft 36 of galvanometer 23 schematically moves vane 41 in Figure 6 in a vertical direction. Galvanometer 23 is connected across the modulating direct current source 84 by means of base pins 74 and 75.

The wiring in Figure 8 is similar to the wiring in Figure 6 with the difference that point B is grounded electrically and a cathode follower 85 is connected to point A which is a common point between plates 58 and 59. Spiral spring 63 is connected to ground in Figure 3 for the purpose of Figure 8, and tube 66 may be used in cathode follower 85.

The wiring in Figure 10 is similar to the wiring in Figure 8 except that a resistor 86 is connected between points C and B and the input to an amplifier 87 is connected between point A and ground. Amplifier 87 will generally be a cathode follower circuit.

Arms 42 and 43 of vane 41 are rotated by galvanometer 23 between the respective condenser plates, and the arms are spaced in this embodiment midway between adjacent plates.

When no signal is applied, vane 41 is spring biased so that arm 42 covers one-half the area of plates 46 and 58, and arm 43 covers one-half the area of plates 47 and 59. Therefore, the remaining one-half of the area of each pair of plates is not covered by vane 41.

Since an air dielectric exists in the spacing between the respective plates and arms, there are, in effect, three capacitors at each end of the vane. One capacitor is provided by the uncovered area, a second is provided by the arm and the covered area of one adjacent plate, and the third is provided by the arm and the covered area of the other adjacent plate. Each end of the vane therefore has in effect three component condensers.

It will be remembered that the capacitance of a parallel plate condenser is directly proportional to the area of its plates and inversely proportional to the distance between the plates. The capacitance of the first of the three above described condensers is therefore one-half the capacitance of either the second or third condenser, when no signal is received, because all of their areas are equal at that instant and the plates of the former condenser are spaced twice the distance of the plates in either of the latter two condensers.

Rotation by vane 41 changes the covered and uncovered areas of the plates and accordingly changes the capacitance of the respective condensers. The three effective condensers at one end of the vane change in an equal and opposite manner from the three effective condensers at the other end of the vane. It will be noted in Figures 4 and 5 that vane arms 42 and 43 are diametrically opposite to each other while the plates on each annular ring are on the same semicircular side with only edges 48 and 49 on annular ring 27 and edges 45 and 50 on annular ring 26 aligned diametrically. This arrangement of plates and arms allows opposite area changes to occur in the condensers located at the opposite ends of vane 41. For example, when vane 41 is rotated in a clockwise direction in Figure 4, plates 59 and 47 have more than one-half of their areas covered by arm 43 and plates 58 and 46 have less than one-half of their areas covered by arm 42.

The only parameter of the condensers changed by vane rotation is area. The plates in this embodiment are shaped so that the covered areas change linearly with vane rotation to provide linearity between change of capacitance of the respective capacitors and galvanometer movement. Since galvanometer 23 moves linearly with direct current signal, the resultant capacitance must change linearly with signal.

Each adjacent pair of capacitor plates and their vane arm may be represented by an equivalent circuit consisting of three capacitors connected in pi. For example, plates 46 and 58 with arm 42 in Figure 8 may be represented by condensers 91, 92 and 93 in Figure 9. This will be apparent when it is realized that the capacitance between the uncovered areas of plates 46 and 58 is the equivalent of condenser 91, the capacitance between arm 42 and plate 46 is the equivalent of another condenser 92, and the capacitance between arm 42 and plate 58 is the equivalent of a third condenser 93. Condensers 92 and 93 vary oppositely from condenser 91, since the areas of the former increase while the area of the latter decreases.

However, a single equivalent capacitor 94 in Figure 7 will substantially represent the capacitance between arm 42 and the connected plate 46 in Figure 6 because only two terminals of the equivalent pi circuit are connected.

Figure 7 shows an electrically equivalent circuit for the wiring diagram in Figure 6. When unactuated, vane 41 covers one-half the area of all capacitor plates and equivalent circuit capacitors 94 and 95 in Figure 7 are equal and hence the bridge circuit is balanced. Point B is at ground voltage because the commutating voltage is cancelled across equal bridge arms, and there will be no modulated voltage across the load.

When a direct current signal energizes and rotates galvanometer 23, condensers 94 and 95 are made unequal, the bridge unbalances, and the voltage at point B varies proportionately to provide a modulated output across load 76.

Figure 9 represents an equivalent circuit of the diagram in Figure 8. Since all condenser plates are connected in Figure 8, the equivalent pi circuit must be used to represent each arm and adjacent plates. Capacitors 92 and 93 tend to bypass the load but their effect is minimized when the load has a high input impedance such as is provided by a cathode follower.

The circuit of Figure 10 is an improvement on that of Figure 8 because the voltage at points A and B is maintained equal by means of resistor 86 and the bypass effect of capacitors 93 and 97 in Figure 9 is nullified because there is no voltage across them.

The frequency response of the invention to the varying direct current signal is determined by the mass of the rotating parts in the invention. Their mass should be minimized for high frequency response.

Only a very small amount of signal energy is required to rotate the very light vane, shaft, and galvanometer armature. Vane movement due to the small signal may, therefore, cause large changes in capacitance. The resulting modulation may be of a much higher order than the signal in both voltage and power—hence the modulated output of the invention may be several hundred times the input.

The bridge circuit in this invention generally provides a very high output impedance and operates best with a high impedance load such as the input circuit of a cathode follower. Impedance matching is important in utilizing the gain of the invention.

The circuits in Figures 8 and 10 generally operate better than the circuit in Figure 6 because the former avoid much of the distributed capacitance found in the latter due to the direct connection to the vane.

The linearity between the signal input and modulated output is a function of the shape of the capacitor plates and is easily controllable in this invention. Where a non-linear output is desired, the capacitor plates can accordingly be shaped.

This invention also permits polyphase operation. In such case, a pair of plates and an intermediate vane arm are provided for each phase, and a different phase is applied to each pair of plates. Therefore, with the illustrated embodiments, two phase operation is obtainable by applying a quadrature alternating voltage to each pair of capacitor plates.

It is therefore seen that this invention provides a modulator which changes a varying direct current signal into a much larger alternating signal. There will be very little noise pickup in the invention because the signal is electrically isolated from the commutating source. The invention provides high voltage and power amplification, and the linearity between the input and output may be easily controlled.

Although specific embodiments of the invention have been shown, it will be understood that modifications may be made by one skilled in the art without departing from the scope and spirit of the invention as defined by the following claims.

I claim:

1. A capacity vane modulator bridge comprising, a base member, a tube base mounted in said base member, first supporting means, a supporting plate mounted above said base member on said first supporting means, a cylindrical casing fixed upright on said supporting member, a galvanometer mounted in said casing with its shaft extending upwardly through said casing, a first annular ring fixed to the upper end of said casing, a plurality of spacers mounted on said first annular ring, a second annular ring mounted on said spacers with said first annular ring, a first capacitor plate mounted on one side of the upper surface of said first ring, a second capacitor plate mounted on one side of the lower surface of said first ring and facing said first capacitor plate, a third capacitor plate mounted on the opposite side of the upper surface of said first ring, a fourth capacitor plate mounted on said lower surface of said second annular ring facing said second capacitor plate, a vane mounted on said galvanometer shaft with its ends spaced between said annular rings, and wiring means connecting said capacitor plates, vane and galvanometer to said tube base.

2. A capacity vane modulator comprising, a base member, a tube base fixed in said base member, a shield fastened on said base member to provide an entirely closed volume, a supporting plate, a plurality of standoffs extending from said base member and supporting said plate, a cylindrical casing mounted on said supporting plate, a galvanometer mounted in said casing with its shaft extending through the upper end of said casing, a first annular ring of insulating material mounted at the upper end of said casing, a plurality of spacers fixed on the upper surface of said first annular ring, a second annular ring of insulating material, a bearing support fastened to said second annular ring, a first bearing mounted in said bearing support and supporting one end of said shaft, a second bearing support mounted on said supporting plate, a second bearing mounted in said second bearing support and supporting the other end of said shaft, a vane mounted transversely of said shaft, a first arm supported at one end of said vane and spaced between said annular rings, a second arm supported at the opposite end of said vane symmetrically with said first arm and spaced between said annular rings, first and second capacitor plates mounted on said first and second annular rings respectively facing each other and adjacent said first arm, a second pair of capacitor plates mounted on said first and second annular rings respectively facing each other and adjacent the second vane arm, spring means between said vane and said bearing support, and wiring means connecting said galvanometer and capacitor plates to said tube.

3. A device as in claim 2 wherein an edge of said first pair of capacitor plates is diametrically aligned with an edge of said second pair of capacitor plates and all of said capacitor plates are on the same semicircular side of said annular rings, and said galvanometer shaft is spring biased initially so that the respective vane arms cover one-half the area of said capacitor plates.

References Cited in the file of this patent

UNITED STATES PATENTS

| | | |
|---|---|---|
| 1,984,156 | Purington | Dec. 11, 1934 |
| 2,019,481 | Applegate | Nov. 5, 1935 |
| 2,439,255 | Longfellow | Apr. 6, 1948 |
| 2,532,060 | Dicke | Nov. 28, 1950 |
| 2,647,252 | Moore | July 28, 1953 |